US010095452B2

(12) United States Patent
Anbalagan et al.

(10) Patent No.: US 10,095,452 B2
(45) Date of Patent: Oct. 9, 2018

(54) METHOD AND SYSTEM FOR PROVIDING ASSISTANCE BY MULTI-FUNCTION DEVICE FOR DOCUMENT PREPARATION

(71) Applicant: XEROX CORPORATION, Norwalk, CT (US)

(72) Inventors: Ashok Raj Anbalagan, Chennai (IN); Angom Pradeep Master, Imphal West (IN)

(73) Assignee: Xerox Corporation, Norwalk, CT (US)

( * ) Notice: Subject to any disclaimer, the term of this patent is extended or adjusted under 35 U.S.C. 154(b) by 25 days.

(21) Appl. No.: 15/433,025

(22) Filed: Feb. 15, 2017

(65) Prior Publication Data
US 2018/0232185 A1    Aug. 16, 2018

(51) Int. Cl.
| G06F 3/12 | (2006.01) |
| H04N 1/00 | (2006.01) |
| H04N 1/387 | (2006.01) |
| G06K 9/46 | (2006.01) |
| G06K 9/68 | (2006.01) |
| G06K 15/02 | (2006.01) |
| G06K 9/00 | (2006.01) |

(52) U.S. Cl.
CPC .......... *G06F 3/1243* (2013.01); *G06F 3/1204* (2013.01); *G06F 3/1208* (2013.01); *G06F 3/1224* (2013.01); *G06K 9/00449* (2013.01); *G06K 9/4652* (2013.01); *G06K 9/6835* (2013.01); *G06K 9/6878* (2013.01); *G06K 15/1893* (2013.01); *H04N 1/00204* (2013.01); *H04N 1/00307* (2013.01); *H04N 1/00331* (2013.01); *H04N 1/00344* (2013.01); *H04N 1/387* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| 5,640,577 | A | 6/1997 | Scharmer |
| 9,063,581 | B2 * | 6/2015 | Raguseo ............... G06F 3/0237 |
| 9,305,245 | B2 * | 4/2016 | Tripathi ................. G06K 9/726 |
| 9,582,230 | B1 * | 2/2017 | Sankaran ........... H04N 1/00307 |
| 2008/0292191 | A1 * | 11/2008 | Okita ..................... H04N 1/387 382/187 |
| 2011/0271173 | A1 | 11/2011 | Alt-Mokhtar et al. |

(Continued)

*Primary Examiner* — Scott A Rogers

(57) ABSTRACT

The disclosed embodiments illustrate method and system for providing assistance for document preparation. The method includes processing one or more portions for one or more field names in an electronic document by a multifunction device. The electronic document corresponds to a hand-filled document, which comprises a character string in a first format for a field name. Further, one or more portions are processed to determine a second format and a location of each character string. A set of information is received in a pre-specified format for the one or more field names from a user-computing device. A field value for each of the processed one or more portions is determined based on a match between the character string and key strings associated with field names. The electronic document is updated based on replacement of the processed one or more portions with corresponding determined field value at the location.

23 Claims, 6 Drawing Sheets

(56) References Cited

U.S. PATENT DOCUMENTS

| | | | |
|---|---|---|---|
| 2014/0201102 A1* | 7/2014 | Srinivasan | G06Q 10/00 |
| | | | 705/342 |
| 2014/0281871 A1 | 9/2014 | Brunner et al. | |
| 2014/0334732 A1* | 11/2014 | Jung | G06F 3/04883 |
| | | | 382/188 |
| 2015/0205777 A1* | 7/2015 | Campanelli | G06F 17/243 |
| | | | 715/226 |
| 2018/0046605 A1* | 2/2018 | Hickey | G06F 3/04883 |
| 2018/0060291 A1* | 3/2018 | Giffard-Burley | |
| | | | G06F 3/04883 |

* cited by examiner

METHOD AND SYSTEM FOR PROVIDING ASSISTANCE BY MULTI-FUNCTION DEVICE FOR DOCUMENT PREPARATION

TECHNICAL FIELD

The presently disclosed embodiments are related, in general, to document processing. More particularly, the presently disclosed embodiments are related to a method and system for providing assistance by a multi-function device for document preparation.

BACKGROUND

Various public sector services, such as banking, telecom, and insurance services, play a significant role in day-to-day life of many individuals. In order to subscribe to any of such services, customers may be required to complete or otherwise fill corresponding application form(s). Typically, the field names and templates of such application form(s) vary based on the service at hand. For example, a customer seeking to open a new account with a bank may be required to complete an account opening form, while another customer seeking to apply for a loan may be required to complete a corresponding loan application form.

Usually, the customers manually fill such application form(s) with their personal data. Many a times, the customers write very fast due to which the handwriting may appear to be scribbled. It may happen that the first letter is legible but not the rest. Such application form(s) may become difficult to be processed by the representatives of the service providers as the information filled in by the customers may not be read appropriately. Further, it may become redundant for the customers also to fill same information repeatedly in multiple application form(s) as much of the information required by the application form(s) corresponding to different services, administrations or organizations is common. For example, a customer filling an application form for opening a bank account and another application form for applying for a loan, may be required to provide same information, such as name, date of birth, address, contact number, in both the forms. Furthermore, if the information to be filled is alpha-numerical, such as credit card number or social security number, the customer may have to pull out relevant document, such as credit card or social security card, to copy the alpha-numerical sequence. These approaches may be inefficient as they require significant manual effort (which may be error-prone) and increase the completion time for filling multiple application forms.

Currently, various systems and methods are implemented to automate this process of form filling. One method may correspond to auto-filling of electronic forms especially in web pages. Another method may correspond to scanning the paper application form and fill in digitally. Yet another automated method may correspond to recognizing field names and then receiving the field values from external systems. However, such systems and methods may not be robust when the received personal data of the customer is used to fill many different application form(s) and the field names in such application form(s) are different. Such systems and methods may further be inefficient as they require high storage capacity and processing speed due to dependency on the field names, template, and language of the application form(s). Thus, a robust, efficient, and simple system and method may be required to provide assistance for filling such application form(s).

Further limitations and disadvantages of conventional and traditional approaches will become apparent to a person with ordinary skill in the art, through a comparison of described systems with some aspects of the present disclosure, as set forth in the remainder of the present application and with reference to the drawings.

SUMMARY

According to embodiments illustrated herein, there may be provided a method for providing assistance, by a multi-function device (MFD), for document preparation. The method includes processing, by one or more processors in the MFD, one or more portions for one or more field names in an electronic document. The electronic document corresponds to a hand-filled document comprising a character string in a first format for a field name of the one or more field names in the hand-filled document. Further, the one or more portions are extracted from the electronic document to determine a second format and location of the character string in the electronic document. The method further includes receiving, by the one or more processors, a set of information in a pre-specified format for the one or more field names from the user-computing device over a communication network. Further, the set of information comprises at least a plurality of key strings and corresponding values. The method further includes determining, by the one or more processors, a field value for each processed one or more portions in the electronic document based on a match between the character string in the second format and key strings associated with field names in the received set of information. The method further includes updating, by the one or more processors, the electronic document based on replacement of the processed one or more portions in the electronic document for each of the one or more field names with corresponding determined field value at the location.

According to embodiments illustrated herein, there may be provided a system for providing assistance, by an MFD, for document preparation. The system includes one or more processors in the MFD configured to process one or more portions for one or more field names in an electronic document. The electronic document corresponds to a hand-filled document comprising a character string in a first format for a field name of the one or more field names in the hand-filled document. Further, the one or more portions are extracted from the electronic document to determine a second format and location of the character string in the electronic document. The system further includes the one or more processors configured to receive a set of information in a pre-specified format for the one or more field names from the user-computing device over a communication network. Further, the set of information comprises at least a plurality of key strings and corresponding values. The system further includes the one or more processors configured to determine a field value for each processed one or more portions in the electronic document based on a match between the character string in the second format and key strings associated with field names in the received set of information. The system further includes the one or more processors configured to update the electronic document based on replacement of the processed one or more portions in the electronic document for each of the one or more field names with corresponding determined field value at the location.

According to embodiments illustrated herein, there may be provided a computer program product for use with an MFD. The computer program product comprises a non-transitory computer readable medium storing a computer program code for providing assistance for document preparation. The computer program code is executable by one or more processors in the MFD to process one or more portions for one or more field names in an electronic document. The electronic document corresponds to a hand-filled document comprising a character string in a first format for a field name of the one or more field names in the hand-filled document. Further, the one or more portions are extracted from the electronic document to determine a second format and location of the character string in the electronic document. The computer program code is further executable by the one or more processors to receive a set of information in a pre-specified format for the one or more field names from the user-computing device over a communication network. Further, the set of information comprises at least a plurality of key strings and corresponding values. The computer program code is further executable by the one or more processors to determine a field value for each processed one or more portions in the electronic document based on a match between the character string in the second format and key strings associated with field names in the received set of information. The computer program code is further executable by the one or more processors to update the electronic document based on replacement of the processed one or more portions in the electronic document for each of the one or more field names with corresponding determined field value at the location.

BRIEF DESCRIPTION OF DRAWINGS

The accompanying drawings illustrate the various embodiments of systems, methods, and other aspects of the disclosure. A person having ordinary skills in the art would appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
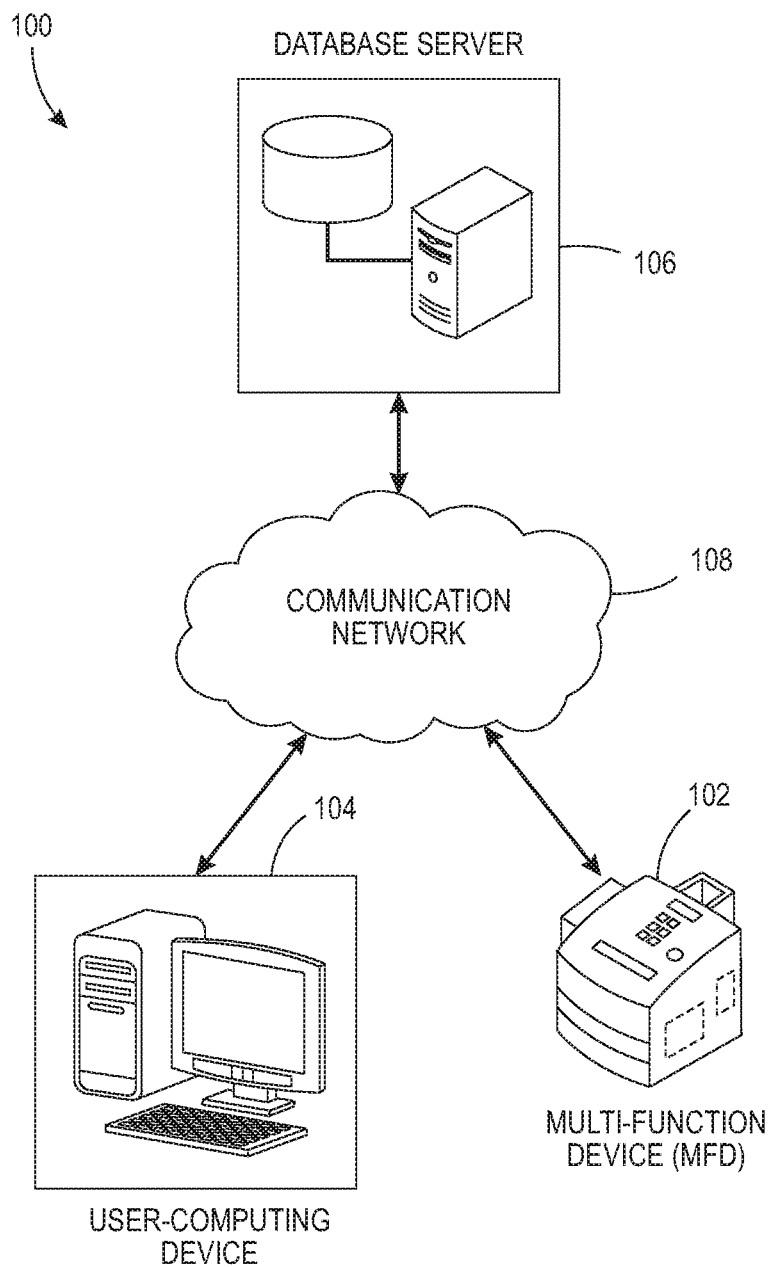
FIG. 1 is a block diagram that illustrates a system environment in which various embodiments can be implemented, in accordance with at least one embodiment.

The present disclosure may be best understood with reference to the detailed figures and description set forth herein. Various embodiments are discussed below with reference to the figures. However, those skilled in the art would readily appreciate that the detailed descriptions given herein with respect to the figures are simply for explanatory purposes, as the method and system may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions

The following terms shall have, for the purposes of this application, the respective meanings set forth below:

A "user-computing device" refers to a computer, a device (that includes one or more processors/microcontrollers and/or any other electronic components), or a system (that performs one or more operations according to one or more sets of programming instructions, codes, or algorithms) associated with a user. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

An "MFD" refers to a multi-function device that can perform multiple pre-defined operations either automatically or based on one or more commands provided by a user. Examples of the pre-defined operations may include, but are not limited to, scanning, processing, printing, copying, faxing, document storing, emailing, networking, displaying, and the like. In an embodiment, the MFD may provide assistance to a user for preparing a document based on the aforesaid operations. In an embodiment, the MFD may be configured to communicate with other electronic device(s), in accordance with one or more communication protocols, such as, but not limited to, file transfer protocol, e-mail, server message block protocol, and network file system. A typical MFD may act as a combination of various devices, such as, but not limited to, a networking device, a Fax machine, a photocopier, a printer, a scanner, and a storage device.

A "hand-filled document" refers to a physical paper document that comprises a plurality of pre-printed field names and corresponding one or more portions at specific locations for filling the corresponding field names. A user may prepare the hand-filled document by providing a character string for each field name in each of the one or more portions. The character string may be a shortened or abbreviated form of the actual field values of the corresponding filed names. The ink color of the character strings are different from an ink color of the pre-printed field names in the hand-filled document.

An "electronic document" refers to a digital image of a hand-filled document, such as a filled application form, which is generated, displayed, processed, and/or stored by an MFD. In an embodiment, the digital image of the hand-filled document includes a plurality of pre-printed field names and corresponding character strings provided by a user. In an embodiment, the MFD may generate the electronic document by scanning the hand-filled document.

An "updated electronic document" refers to a digital image of a hand-filled document that may be generated by an MFD based on one or more operations, such as color filtering, image extraction, handwriting recognition, and string replacement, applied on the generated electronic document. In an embodiment, the updated electronic document includes actual field values, which may be determined from one or more external resources (e.g., an XML file received from a user-computing device), corresponding to a plurality of pre-printed field names in the hand-filled document. The updated electronic document may be further stored in a database or directly printed by the MFD. The updated electronic document may be further shared by the MFD with one or more other computing devices.

A "digital image" refers to a collection of image data retained in an electronic form. The digital image may include, but not limited to, one or more pictorial representations, symbols, text, line art, blank spaces, and/or non-printed regions. The digital image may be stored in various file formats, such as JPG or JPEG, GIF, TIFF, PNG, BMP, RAW, PSD, PSP, PDF, and the like.

A "first format" refers to a format of a character string, which is a shortened or an abbreviated form of an actual field value provided (i.e., handwritten) by a user, in the hand-filled document. The user may write the character string in the first format in a specific portion corresponding to a field name in the hand-filled document. The user may be required to write the character string (in the first format) in a specific ink color that is different from the ink color of the plurality of pre-printed field names.

A "second format" refers to a format of a character string that is determined based on processing of one or more portions extracted from an electronic document generated by an MFD. The second format of the character string is determined based on one or more handwriting recognition techniques applied on the one or more portions extracted from the generated electronic document.

A "pre-specified format" refers to a format of a file that includes a set of information. The file in the pre-specified format may be received by an MFD from a user-computing device, over a short-range communication network, such as near field communication (NFC). An example of the pre-specified format may correspond to an XML file.

A "set of information" refers to information transmitted by a user-computing device to an MFD over a communication network. The set of information may store the user information in the form of key/value pair. The set of information comprises a plurality of field names. Each of the plurality of field names is associated with a corresponding key string of a plurality of key strings. Further, each key string of the plurality of key strings has a corresponding value. For example, for a field name "FirstName," the user information may be stored as <FirstName key="ASH" Value "ASHISH"/>, where "ASH" is the key string and "ASHISH" is the value that corresponds to the actual field value that the user desires to fill for the field name "FIRST NAME."

A "field name" refers to a string of alphanumeric characters that is pre-printed on a physical paper document. For each field name, a user may provide a character string in a specified portion of the physical paper document.

A "field value" refers to an actual character string corresponding to a shortened or abbreviated form in a first format provided by a user for an actual field value. In an embodiment, an MFD may determine the actual field value by performing a match between a character string in a second format and key strings in a received set of information.

FIG. 1 is a block diagram of a system environment in which various embodiments of a method and a system for providing assistance for document preparation by an MFD may be implemented, in accordance with at least one embodiment. With reference to FIG. 1, a system environment 100 is shown that includes various devices, such as an MFD 102, user-computing device 104, and a database server 106. Various devices in the system environment 100 may be interconnected over a communication network 108. FIG. 1 shows, for simplicity, one MFD, (such the MFD 102), one user-computing device (for example, the user-computing device 104), and one database server (for example, the database server 106). However, it will be apparent to a person with ordinary skill in the art that the disclosed embodiments may also be implemented using multiple user-computing devices, multiple database servers, and multiple MFDs without departing from the scope of the disclosure.

The MFD 102 may correspond to a device with multiple functionalities that may be configured to provide assistance to a user for preparing a document based on one or more pre-defined operations, for example, scanning, processing, printing, copying, faxing, document storing, emailing, networking, and/or displaying. The MFD 102 may include one or more processors in communication with one or more memory units. The one or more processors may be operable to execute one or more sets of computer-readable code, instructions, programs, routines, scripts, or algorithms, stored in the one or more memory units for supporting a hosted application or a software and/or hardware service. The hosted application or the software and/or hardware service may be configured to perform the one or more pre-defined operations. Thus, the MFD 102 may act as a combination of various devices, such as, but not limited to, a networking device, a fax machine, a photocopier, a multi-functional printer, a scanner, and a storage device. An embodiment of the structure of the MFD 102 is described later in FIG. 2.

In an embodiment, the MFD 102 may be communicatively coupled to other devices, such as the user-computing device 104 and the database server 106, over the communication network 108. The MFD 102 may be configured to communicate with such other electronic device(s), in accordance with one or more communication protocols, such as, but not limited to, file transfer protocol, e-mail, server message block protocol, and network file system.

In an embodiment, the scanner in the MFD 102 may be configured to scan a hand-filled document provided by a user and generate an electronic document, i.e., a digital image, for the hand-filled document. In an embodiment, the MFD 102 may be configured to directly receive the electronic document from an application server (not shown), over the communication network 108. In such case, the application server is configured to generate the electronic document from the hand-filled document and transmit the generated electronic document to the MFD 102, over the communication network 108. Thus, hereinafter, the term "generated electronic document" should not be limited to the MFD 102 only. As described above, in one of the embodiments, the term may be construed to be utilized with respect to the application server also, without any deviation from the scope of the disclosure.

The hand-filled document may include pre-printed one or more field names and character strings that are in a first format for each of the one or more field names. The MFD 102 may be further configured to generate an electronic document based on the conversion of the received hand-filled document (optically scanned) to the digital image.

The MFD 102 may be further configured to extract one or more portions from the generated electronic document. The one or more portions may correspond to the one or more field values for which the user has provided the character strings in the hand-filled document. The MFD 102 may prompt the user to provide the color of ink via a display screen of the MFD 102 for the extraction of the one or more portions. The MFD 102 may utilize a color filter to extract the one or more portions from the generated electronic document based on the ink color. The MFD 102 may be further configured to determine the location of the one or more portions extracted from the generated electronic document.

The MFD 102 may be further configured to process the extracted one or more portions to determine a second format of the character strings. The MFD 102 may be further configured to prompt the user-computing device 104 associated with the user to provide a set of information for one or more field names in a pre-specified format. Accordingly, the MFD 102 may receive the set of information in the pre-specified format from the user-computing device 104 over the communication network 108.

The MFD 102 may be configured to determine the field value for each of the processed one or more portions in the electronic document based on the match between the character string in the second format determined in the generated electronic document and key strings from the set of information in the pre-specified format received from the user-computing device 104. The MFD 102 may be configured to update the generated electronic document based on the replacement of the processed one or more portions with the corresponding determined values from the set of information received from the user-computing device 104.

The MFD 102 may be configured to determine a template corresponding to the hand-filled document based on the updated electronic document. The MFD 102 may be configured to perform one or more operations, such as printing of the updated electronic document, printing of a selected portion of the updated electronic document, and sharing the updated electronic document (or a portion of the updated electronic document) with one or more computing devices which may or may not include the user-computing device 104. The MFD 102 may be configured to store the template of the updated electronic document and log of one or more operations on the updated electronic document in local memory or the database server 106.

The user-computing device 104 may refer to a computing device (associated with a subscriber of a service) that may be communicatively coupled to other devices, such as the MFD 102, over the communication network 108. The user-computing device 104 may include one or more processors in communication with one or more memory units. Further, in an embodiment, the one or more processors may be operable to execute one or more sets of computer-readable code, instructions, programs, or algorithms, stored in the one or more memory units, to perform one or more operations. The user-computing device 104 may correspond to various types of computing devices, such as, but not limited to, a desktop computer, a laptop, a PDA, a mobile device, a smartphone, a tablet computer (e.g., iPad® and Samsung Galaxy Tab®), and the like.

In an embodiment, the user-computing device 104 may be associated with a user, such as a subscriber, a visitor, or a student. The user-computing device 104 may transmit a set of information to the MFD 102 in a pre-specified format based on a prompt or request received from the MFD 102, over the communication network 108, such as the NFC. In an embodiment, the set of information may comprise user information in the form of key/value pair. For example, for a field name "FirstName," the information may be stored as <FirstName key="ASH" Value "ASHISH"/>, where "ASH" is the key string and "ASHISH" is the actual field value that the user desires to fill for the field name "FirstName."

The database server 106 may refer to a storage device that may be communicatively coupled to other electronic devices, such as the MFD 102 and the user-computing device 104, over the communication network 108. In an embodiment, the database server 106 may be configured to transmit or receive one or more instructions/metadata to/from such other electronic devices, over the communication network 108. In an embodiment, the database server 106 stores one or more sets of instructions, code, scripts, or programs that may be executed to perform the one or more operations. In an embodiment, the database server 106 may be configured to store the generated electronic document and/or the updated electronic document provided by the MFD 102, over the communication network 108.

For querying the database server 106, one or more querying languages may be utilized such as, but not limited to, structured query language (SQL), relational database query language (QUEL), data mining extensions (DMX), and so forth. In an embodiment, the database server 106 may be realized through various technologies, such as, but not limited to, Microsoft® SQL Server, Oracle®, IBM DB2®, Microsoft Access®, PostgreSQL®, MySQL®, and SQLite®.

A person with ordinary skill in the art would appreciate that the scope of the disclosure is not limited to realizing the MFD 102 and the database server 106 as separate entities. In an embodiment, the database server 106 may be realized as an application program installed on and/or running on the MFD 102, without departing from the scope of the disclosure.

The communication network 108 may include a medium through which one or more devices, such as the MFD 102, the user-computing device 104, and the database server 106, may communicate with each other. Examples of the communication network 108 may include, but are not limited to, NFC, adhoc network, the Internet, a cloud network, a Wireless Fidelity (Wi-Fi) network, a wireless local area network (WLAN), a local area network (LAN), a metropolitan area network (MAN), a wireless personal area network (WPAN), a wireless wide area network (WWAN), a cloud network, and/or a long-term evolution (LTE) network. Various devices in the system environment 100 may be configured to connect to the communication network 108, in accordance with various wired and wireless communication protocols. Examples of such wired and wireless communication protocols may include, but are not limited to, NFC protocol, transmission control protocol and internet protocol (TCP/IP), user datagram protocol (UDP), hypertext transfer protocol (HTTP), file transfer protocol (FTP), ZigBee, EDGE, infrared (IR), IEEE 802.11, 802.16, cellular communication protocols, such as long-term evolution (LTE), light fidelity (Li-Fi), and/or Bluetooth (BT) communication protocols.

Figure 2:
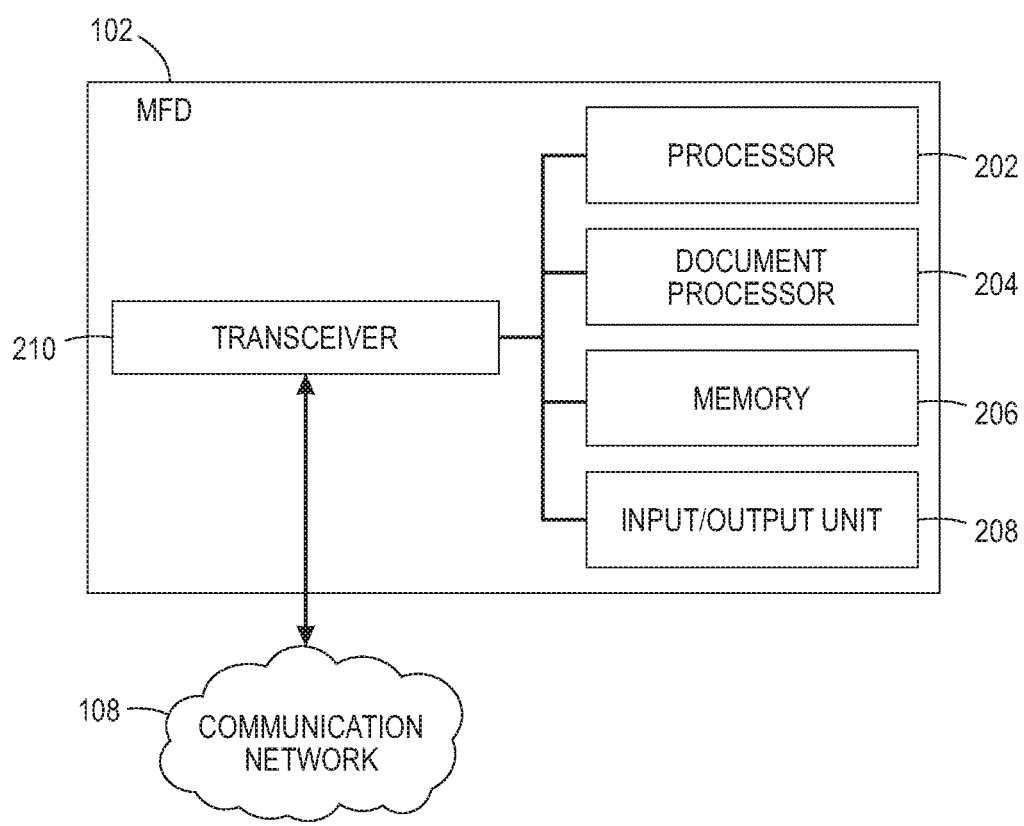
FIG. 2 is a block diagram that illustrates a system for providing assistance for document preparation by a MFD, in accordance with at least one embodiment.

FIG. 2 is a block diagram that illustrates a system for providing assistance by an MFD for the document preparation, in accordance with at least one embodiment. With reference to FIG. 2, a system 200 is shown that may include a processor 202, a document processor 204, a memory 206, an Input/Output (I/O) unit 208, and a transceiver 210. For the purpose of the ongoing description, the system 200 corresponds to the MFD 102.

The processor 202 may comprise a suitable logic, circuitry, interfaces, and/or a code that may be configured to execute the one or more sets of instructions, programs, or algorithms stored in the memory 206 to perform the one or more operations. The processor 202 may be communicatively coupled to the document processor 204, the memory 206, the I/O unit 208, and the transceiver 210. The processor 202 may be further communicatively coupled to the communication network 108. The processor 202 may be implemented based on a number of processor technologies known in the art. The processor 202 may work in coordination with the document processor 204, the memory 206, the I/O unit 208, and the transceiver 210 for providing the assistance by the MFD 102 for the document preparation. Examples of the processor 202 include, but are not limited to, an X86-based processor, a reduced instruction set computing (RISC) processor, an application-specific integrated circuit (ASIC) processor, a complex instruction set computing (CISC) processor, and/or other processors.

In an embodiment, the processor 202 may be configured to generate an electronic document based on conversion of the received hand-filled document (optically scanned) to the digital image. The digital image of the generated electronic document may correspond to PNG format, GIF format, JPEG format, and the like, compatible and supported by the MFD 102. In an embodiment, the processor 202 may be configured to store the generated electronic document in the database server 106, over the communication network 108. Alternatively, the processor 202 may be configured to temporarily store the generated electronic document in local buffer or the memory 206 of the MFD 102.

In an embodiment, the processor 202 may be configured to receive the electronic document from the application server, over the communication network 108. The application server is configured to generate the electronic document from the hand-filled document and transmit the generated electronic document to the MFD 102, over the communication network 108.

The processor 202, in conjunction with the transceiver 210, may be configured to transmit a request, regarding the auto-filling of the physical paper document, i.e., preparation of the document, to the user-computing device 104 over the communication network 108. Further, the processor 202, in conjunction with the transceiver 210, may be configured to prompt the user-computing device 104 to provide a set of information for one or more field names in a pre-specified format. Accordingly, the processor 202, in conjunction with the transceiver 210, may receive the set of information in the pre-specified format from the user-computing device 104 over the communication network 108, such as NFC. The processor 202 may be further configured to perform one or more operations, such as printing of the updated electronic document, printing of a selected portion of the updated electronic document, and sharing the updated electronic document (or a portion of the updated electronic document) with one or more computing devices which may or may not include the user-computing device 104.

The document processor 204 may comprise a suitable logic, circuitry, interfaces, and/or a code that may be configured to execute the one or more sets of instructions, programs, or algorithms stored in the memory 206 to perform the one or more operations. The document processor 204 may be communicatively coupled to the processor 202, the memory 206, the I/O unit 208, and the transceiver 210. The document processor 204 may be implemented based on a number of processor technologies known in the art. The document processor 204 may work in coordination with the processor 202, the memory 206, the I/O unit 208, and the transceiver 210 for providing the assistance by the MFD 102 to the user for the document preparation. Examples of the document processor 204 include, but are not limited to, an X86-based processor, a reduced instruction set computing (RISC) processor, an application-specific integrated circuit (ASIC) processor, a complex instruction set computing (CISC) processor, and/or other processors.

In an embodiment, the document processor 204 may be configured to extract one or more portions from the electronic document generated by the processor 202. The one or more portions may correspond to document areas at which the user has provided the character strings for one or more field names in the hand-filled document. The document processor 204 may utilize a color filter to extract the one or more portions from the generated electronic document.

In an embodiment, the document processor 204 may be configured to determine the location of the one or more portions extracted from the generated electronic document. The document processor 204 may be configured to determine the locations of the one or more portions are extracted from the generated electronic document by one or more edge detection techniques.

In an embodiment, the document processor 204 may be configured to process the extracted one or more portions. The document processor 204 may be configured to process the extracted one or more portions to determine the second format of the character strings. In an embodiment, the document processor 204 may be configured to determine the actual field value for each of the processed one or more portions in the electronic document based on a match between the character string in the second format determined in the generated electronic document and key strings from the set of information in the pre-specified format received from the user-computing device 104.

In an embodiment, the document processor 204 may be configured to update the generated electronic document based on the replacement of the processed one or more portions with the corresponding determined values from the set of information received from the user-computing device 104. The document processor 204 replaces the character strings in the second format in the generated electronic document with the determined values at respective locations in the updated electronic document.

In an embodiment, the document processor 204 may be configured to determine a template corresponding to the hand-filled document based on the updated electronic document. The document processor 204 may be configured to store the template of the updated electronic document and log of one or more operations on the updated electronic document in the database server 106.

The memory 206 may be operable to store one or more machine code and/or computer programs that have at least one code section executable by the processor 202, the document processor 204, the I/O unit 208, and the transceiver 210. The memory 206 may store the one or more sets of instructions, programs, code, or algorithms that are executed by the processor 202 and the document processor 204. In an embodiment, the memory 206 may include one or more buffers (not shown). In an embodiment, the one or more buffers may be configured to store the generated electronic document and the updated electronic document. In an embodiment, the memory 206 may store one or more edge detection techniques, one or more handwriting recognition techniques, and one or more color-based data filtering techniques. Some of the commonly known memory implementations may include, but are not limited to, a random access memory (RAM), a read only memory (ROM), a hard disk drive (HDD), and a secure digital (SD) card. It will be apparent to a person with ordinary skill in the art that the one or more instructions stored in the memory 206 enables the hardware of the system 200 to perform the one or more operations.

The I/O unit 208 comprises suitable logic, circuitry, interfaces, and/or a code that may be operable to facilitate the MFD 102 to perform various input or output functions. For example, the I/O unit 208 may be configured to receive the hand-filled document based on an optical scanning performed on the hand-filled document. In an embodiment, the I/O unit 208, e.g., the touch screen, may be configured to receive an input, such as a selectable option "Auto-fill," from the user pertaining to assistance for document preparation. In an embodiment, the display screen of the I/O unit 208 may prompt the user to provide the color of the ink. In an embodiment, the I/O unit 208 may be configured to print the updated electronic document based on a print command at the MFD 102.

The I/O unit 208 may be operable to communicate with the processor 202, the document processor 204, the memory 206, and the transceiver 210. Examples of the input devices may include, but are not limited to, a touch screen, a microphone, a camera, one or more sensors, and/or a docking station. The one or more sensors may correspond to a contact image sensor (CIS), a charge-coupled device (CCD), a photomultiplier tube (PMT), and/or the like. Examples of the output devices may include, but are not limited to, a display screen and a printing apparatus.

The transceiver 210 may comprise a suitable logic, circuitry, interfaces, and/or a code that may be, in conjunction with the processor 202, the document processor 204, the memory 206 and/or the I/O unit 208, configured to receive/transmit the one or more queries, request, set of information, or other information from one or more computing devices or servers (e.g., the user-computing device 104 and the database server 106) over the communication network 108. The transceiver 210 may implement one or more known technologies to support wired or wireless communication with the communication network 108.

In an embodiment, the transceiver 210 may include circuitry, such as, but not limited to, an antenna, a radio frequency (RF) transceiver, one or more amplifiers, a tuner, one or more oscillators, a digital signal processor, a universal serial bus (USB) device, a coder-decoder (CODEC) chipset, a subscriber identity module (SIM) card, and/or a local buffer. The transceiver 210 may communicate via wireless communication with networks (such as the Internet), an Intranet and/or a wireless network (such as a cellular telephone network), a WLAN, and/or a metropolitan area network (MAN). The wireless communication may use any of a plurality of communication standards, protocols, and technologies, such as NFC, global system for mobile communications (GSM), enhanced data GSM environment (EDGE), wideband code division multiple access (W-CDMA), code division multiple access (CDMA), time division multiple access (TDMA), Bluetooth, light fidelity (Li-Fi), Wi-Fi (e.g., IEEE 802.11a, IEEE 802.11b, IEEE 802.11g, and/or IEEE 802.11n), voice over Internet Protocol (VoIP), Wi-MAX, a protocol for email, instant messaging, and/or short message service (SMS).

Figure 3:
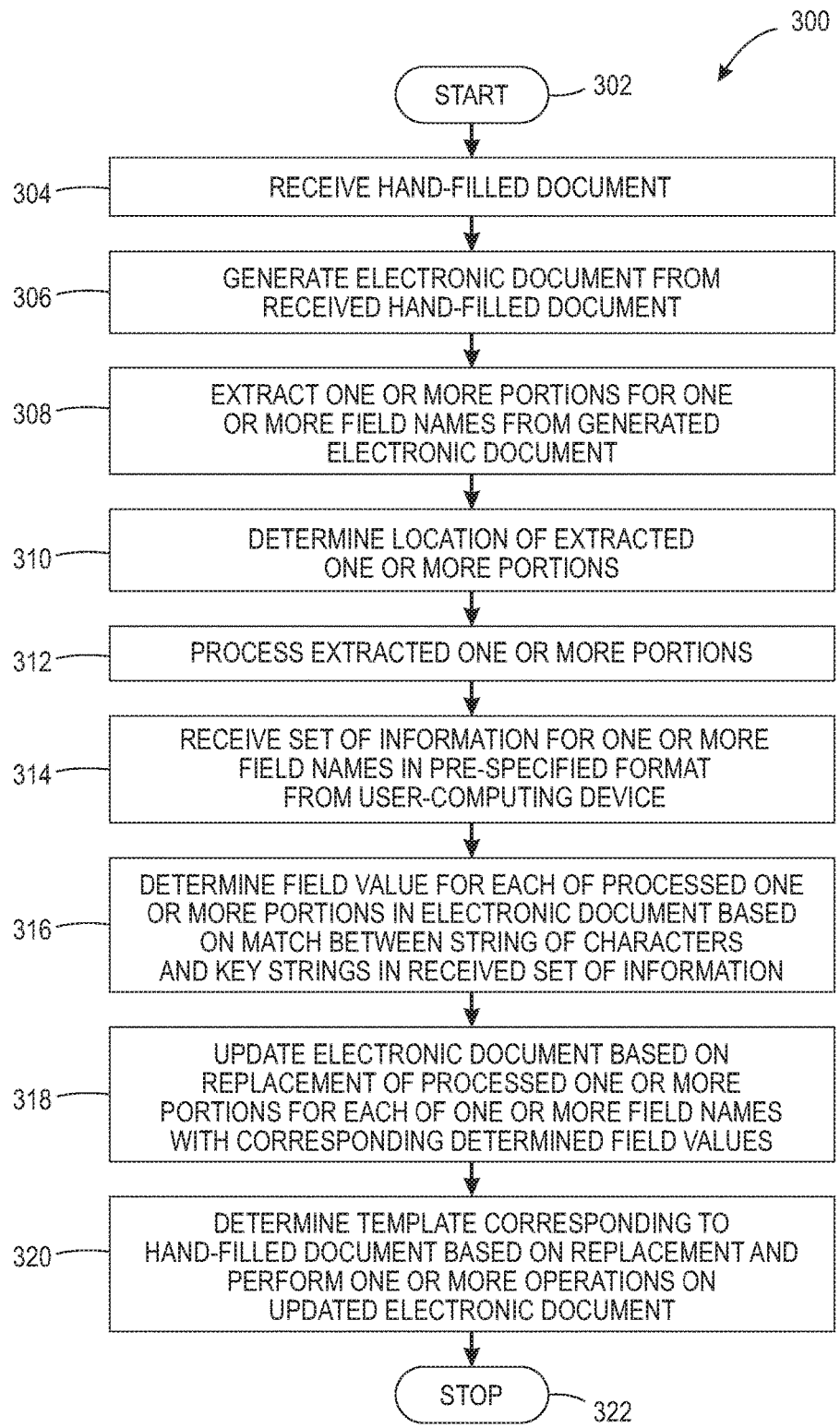
FIG. 3 is a flowchart that illustrate a method for providing assistance for document preparation by a MFD, in accordance with at least one embodiment.

FIG. 3 is a flowchart that illustrates a method for providing assistance for document preparation by an MFD, in accordance with at least one embodiment. With reference to FIG. 3, a flowchart 300 is shown that is described in conjunction with FIG. 1 and FIG. 2. The method starts at step 302 and proceeds to step 304.

At step 304, a hand-filled document is received. In an embodiment, one or more sensors that correspond to an input apparatus of the I/O unit 208 in the MFD 102 may be configured to receive the hand-filled document based on an optical scanning operation performed on the hand-filled document. The one or more sensors may correspond to a contact image sensor (CIS), a charge-coupled device (CCD), a photomultiplier tube (PMT), and/or the like. In an alternative embodiment, the step 304 may be skipped in case the MFD 102 is configured to directly receive an electronic document corresponding to the hand-filled document from an application server, over the communication network 108, as described in step 306.

The hand-filled document may be provided by a user associated with the user-computing device 104. In an embodiment, the hand-filled document may correspond to an application form that the user may desire to fill in order to request for (or avail) one or more services and/or products of an entity, such as a public sector institution, an organization, or an administrative office. The application form may include one or more field names already printed when the user acquires the application form of the entity, as shown in exemplary interface 500A in FIG. 5A. Examples of the one or more field names (mostly common across a plurality of entities) associated with the user may include, but not limited to, name, address, date of birth, city, zip code, state, country, bank account number, social security number and/or the like. In an embodiment, an ink color of the one or more field names in the application form may be of a first color, such as "black." However, a person having ordinary skill in the art will understand that the example of the first color as "black" is merely for illustrative purpose and should not be construed to limit the scope of the disclosure.

Prior to the receipt of the hand-filled document by the one or more sensors in the MFD 102, the user may utilize a marker or a pen for filling the application form comprising pre-printed one or more field names. The user may write character strings (instead of actual field values) corresponding to the one or more field names in the application form. The character strings should be distinct with respect to each other. The character strings may in a first format, i.e., a shortened or abbreviated form of the actual field values of the one or more field names. In an embodiment, the second ink color of the character strings (in a first format) in the application form may be of a specific color, such as "blue." However, a person having ordinary skill in the art will understand that the example of the second ink color as "blue" is merely for illustrative purpose and should not be construed to limit the scope of the disclosure. Further, it may be ensured that the first ink color of the one or more field names in the application form is different from the second ink color of the one or more field values in the application form. For example, if the first ink color of the one or more field names is "black," then the second ink color of the one or more field values is other than "black."

At step 306, an electronic document is generated from the received hand-filled document. In an embodiment, the processor 202 may be configured to generate the electronic document based on the conversion of the received hand-filled document (optically scanned) to the digital image. The digital image of the generated electronic document may correspond to PNG format, GIF format, JPEG format, and the like, which is compatible and supported by the MFD 102. In an embodiment, the processor 202 may be configured to store the generated electronic document in the database server 106, over the communication network 108. Alternatively, the generated electronic document may be temporarily stored in local buffer or memory 206 of the MFD 102. In an embodiment, the processor 202, in conjunction with the transceiver 210, may be configured to receive the electronic document from the application server, over the communication network 108. In such a case, the application server is configured to generate the electronic document from the hand-filled document in a similar manner, as is generated by the MFD 102 in step 304. Subsequently, the application server transmits the generated electronic to the MFD 102, over the communication network 108. An exemplary user interface 500B of an exemplary electronic document has been illustrated in FIG. 5B.

In an embodiment, the user may provide one or more configuration settings for the generated electronic document via a control panel (not shown) provided at the MFD 102. In an example, the one or more configuration settings may correspond to a display resolution of the generated electronic document and selection of one or more parts of the generated electronic document. In another example, the one or more configuration settings may correspond to count of copies required to be printed for the generated electronic document.

At step 308, one or more portions are extracted from the generated electronic document. In an embodiment, the document processor 204 may be configured to extract the one or more portions from the generated electronic document. The one or more portions may correspond to the document areas at which the user has provided the character strings for one or more field names in the hand-filled document.

In an embodiment, the extraction of the one or more portions from the generated electronic document is based on the second ink color of the character string in the generated electronic document. In an embodiment, the document processor 204 may utilize a color filter to extract the one or more portions from the generated electronic document. The color filter may filter the hand-filled character strings in the second ink color by the user, from the one or more portions from the generated electronic document. In an embodiment, the color filter may utilize one or more color-based data filtering techniques, known in the art, for the extraction of the one or more portions from the generated electronic document. Examples of the one or more color-based data filtering techniques may include, but not limited to, color based text detection technique, color based filtering and tracking.

Prior to step 308, the MFD 102 may prompt the user to provide the color of ink via a display screen that corresponds to the I/O unit 208 of the MFD 102 for the extraction of the one or more portions. In an alternate embodiment, the MFD 102 may automatically determine the color of the ink for the extraction of the one or more portions from the generated electronic document.

In an exemplary embodiment, the user may have written the character string in green ink color in the hand-written document. Accordingly, the user selects the color of the ink as "Green" from a drop down list displayed at the display screen of the MFD 102 for the extraction of the one or more portions. Alternatively, the user enters the color name in a text box displayed at the display screen of the MFD 102. Thereafter, the document processor 204 may extract the one or more portions from the generated electronic document for which the character strings are detected to be in green ink color in the generated electronic document. In the exemplary embodiment, five portions, corresponding to the character strings, "ASH," "KUM," "SHA," "&," and "2-9," may be extracted from the generated electronic document.

A person having ordinary skill in the art will understand that the example of the green color of the character strings written by the user is for illustrative purpose and should not be construed to limit the scope of the disclosure.

At step 310, locations of the one or more portions extracted from the generated electronic document are determined. In an embodiment, the document processor 204 may be configured to determine the locations of the one or more portions extracted from the generated electronic document.

In an embodiment, the document processor 204 may be configured to determine the locations of the one or more portions extracted from the generated electronic document by one or more edge detection techniques. Examples of the one or more edge detection techniques may include, but not limited to, a Robert edge detection, a Sobel edge detection, a Prewitt edge detection, a Kirsch edge detection, a Robinson edge detection, a Marr-Hildreth edge detection, a LoG edge detection, and a Canny edge detection technique.

In an embodiment, locations of the one or more portions extracted from the generated electronic document may be indicated by position coordinates of the one or more portions. In an exemplary scenario, position coordinates may correspond to coordinates of corners of a bounding box encompassing the corresponding one or more portions extracted from the generated electronic document. The position coordinates may be determined with respect to a reference point or an origin point (i.e., (0, 0)). In an instance, the geometric center of the generated electronic document may correspond to the reference point. In another instance, the top-most left corner of the generated electronic document may correspond to the reference point. In an exemplary scenario, the position coordinates of a portion corresponding to the character string "ASH" may be (10, 2) that may be determined based on the positional distance of the top-left corner of the bounding box for the character string "ASH," being "10 cm" from the left edge and "2 cm" from the top edge of the generated electronic document.

At step 312, the extracted one or more portions are processed. In an embodiment, the document processor 204 may be configured to process the extracted one or more portions. In an embodiment, the document processor 204 may be configured to process the extracted one or more portions to determine the second format of the character strings. In an embodiment, the second format may be determined based on one or more handwriting recognition techniques, known in the art, applied on the extracted one or more portions. Examples of the one or more handwriting recognition techniques may include, but not limited to, a segmentation-free Hidden Markov modeling, a segmentation-based dynamic programming techniques, online handwriting recognition with support vector machines, and offline based handwriting recognition techniques. In an embodiment, the second format may be determined based on one or more intelligent character recognition (ICR) techniques, known in the art, applied on the extracted one or more portions.

In an embodiment, the result of the processed one or more portions, i.e., the character strings in the second format, may be stored in an array data structure in the local buffer or memory 206.

At step 314, a set of information for one or more field names is received from the user-computing device 104 in a pre-specified format. In an embodiment, the transceiver 210, in conjunction with the processor 202, may be configured to receive the set of information in the pre-specified format from the user-computing device 104 over the communication network 108.

In an embodiment, the pre-specified format may correspond to an XML format. The XML format may comprise user information in the form of key/value pair. For example, the user information may be stored as <FirstName key="ASH" Value "ASHISH"/>, where "ASH" is the key string and "ASHISH" is the actual field value that the user desires to fill for the field name "FIRST NAME" in the generated electronic document.

In an embodiment, the user-computing device 104 may be a portable device, such as a smartphone, with pre-stored set of information in the pre-specified format, provided by the user. In another embodiment, the user-computing device 104 may be configured to generate the set of information based on information collected from one or more external data sources, such as, but not limited to, a plurality of websites, a company portal, an Income tax portal, or a bank information system. The user may also edit/update the set of information in real-time.

Prior to step 314, the processor 202 may prompt the user-computing device 104 associated with the user to provide the set of information for one or more field names in the pre-specified format. The processor 202 may prompt the user-computing device 104 to provide the set of information based on an input, i.e., selection of an auto-fill option, provided to the MFD 102 via the I/O unit 208, such as the touch screen, of the MFD 102. In an embodiment, the transceiver 210, in conjunction with the processor 202, may be configured to receive the set of information in the pre-specified format from the user-computing device 104 over the communication network 108. The user may utilize the user-computing device 104 for the transmission of the set of information to the MFD 102 over the communication network 108. In an embodiment, the communication network 108 may correspond to a short-range network, such as NFC, adhoc network and/or the like.

At step 316, a field value for each of the processed one or more portions in an electronic document is determined. The determination of the field value may be based on a match between the character string in the second format determined in the generated electronic document and key strings from the set of information in the pre-specified format received from the user-computing device 104. In an embodiment, the document processor 204 may be configured to determine the field value for each of the processed one or more portions in the electronic document based on the match between the character string in the second format determined in the generated electronic document and key strings from the set of information in the pre-specified format received from the user-computing device 104.

In an exemplary embodiment, a character string "ASH" is determined in the second format in the generated electronic document. The set of information in the pre-specified format received from the user-computing device 104 may include various tuples, such as <FirstName key="ASH" Value "ASHISH"/>, <MiddleName key="KUM" Value "KUMAR"/>, <LastName key="SHA" Value "SHARMA"/>, and so on. The document processor 204 may determine a match between the character string "ASH" in the second format at a specific location determined in the generated electronic document and the key string "ASH" from the set of information in the XML format received from the user-computing device 104. Accordingly, the document processor 204 may determine the field value as "ASH-ISH" for the processed portion that corresponds to the character string "ASH" in the generated electronic document.

In an exemplary embodiment, the document processor 204 may extract a first character string in the second format, from the array data structure stored in the local buffer or memory 206. The document processor 204 may check whether the extracted first character string is in the received set of information in the pre-defined format, such as XML format. For example, the document processor 204 may check whether the extracted first character string "ASH" is in the received set of information in the pre-defined format, such as XML format. In case the extracted first character string is not in the received set of information, the document processor 204 may check the next character string in the array data structure. In case the extracted first character string is in the received set of information, the document processor 204 may store the information in a specific data structure, such as a map data structure. Typically, a map data structure stores the information in a key-value pair wherein every key is unique. In an exemplary embodiment, the document processor 204 may determine two map data structures, represented as: Map1<location, Value> and Map2<Value, FieldName>, for example, Map1<"(10, 2),″ "ASHISH"> and Map2<"ASHISH," "FirstName">. Here, in Map1, "(10, 2)" are the coordinates of location of the first character string "ASH" in the generated electronic document and "ASHISH" is the value to be filled. In Map2, "ASHISH" is the value and "FirstName" is the field name. In the similar manner, the document processor 204 may store the remaining character strings in the second format, extracted from the array data structure, in the map data structures, Map1 and Map2. The document processor 204 may further check whether the Map1.Value is same as Map2.Value. In case the Map1.Value is same as Map2.Value, the control passes to step 318. Else, the document processor 204 checks whether the Map1.Value is same as next Map2.Value.

A person having ordinary skill in the art will understand that the above exemplary embodiment is for illustrative purpose and should not be construed to limit the scope of the disclosure.

At step 318, the generated electronic document is updated based on a replacement of the processed one or more portions for the one or more field names with corresponding determined values from the set of information (referred to as field values in the electronic document) received from the user-computing device 104. In an embodiment, the document processor 204 may be configured to update the generated electronic document based on the replacement of the processed one or more portions for the one or more field names with the corresponding determined values from the set of information received from the user-computing device 104. An exemplary user interface 500C of an exemplary updated electronic document has been illustrated in FIG. 5C.

In an exemplary embodiment, the user writes the character strings in the first format as, "ASH," "KUM," and "SHA" as the three character strings in the hand-filled document. The document processor 204 determines the respective locations of the character strings in the second format in the generated electronic document. The document processor 204 further determines the corresponding values from the set of information received from the user-computing device 104 as "ASHISH," "KUMAR," and "SHARMA," respectively. The document processor 204 replaces the character strings in the second format in the generated electronic document with the determined values as field values at respective locations in the updated electronic document.

Figure 5A:
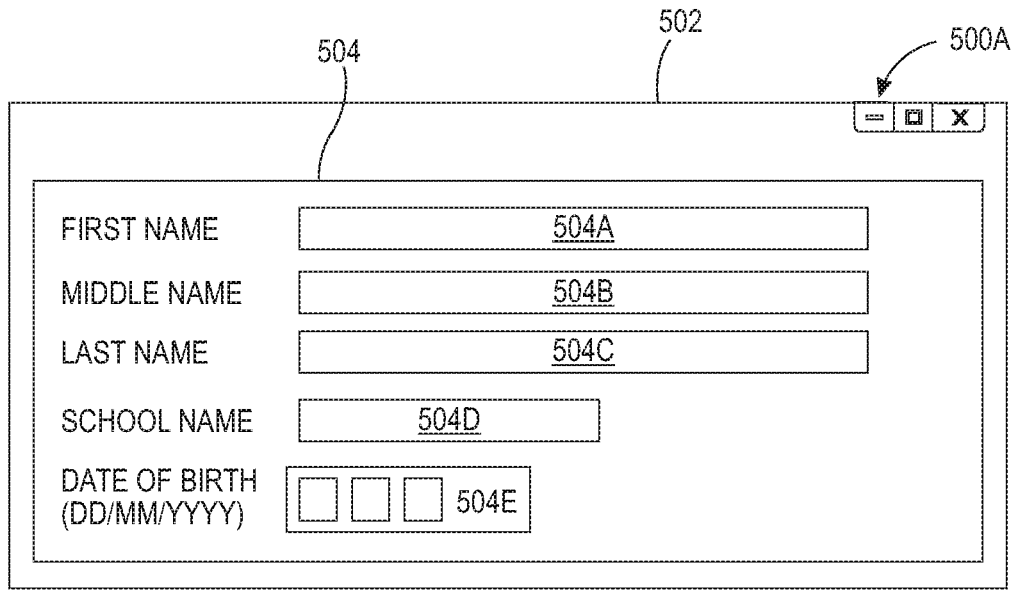
FIGS. 5A, 5B, and 5C, collectively, illustrates various interfaces, in accordance with at least one embodiment.
Figure 5B:
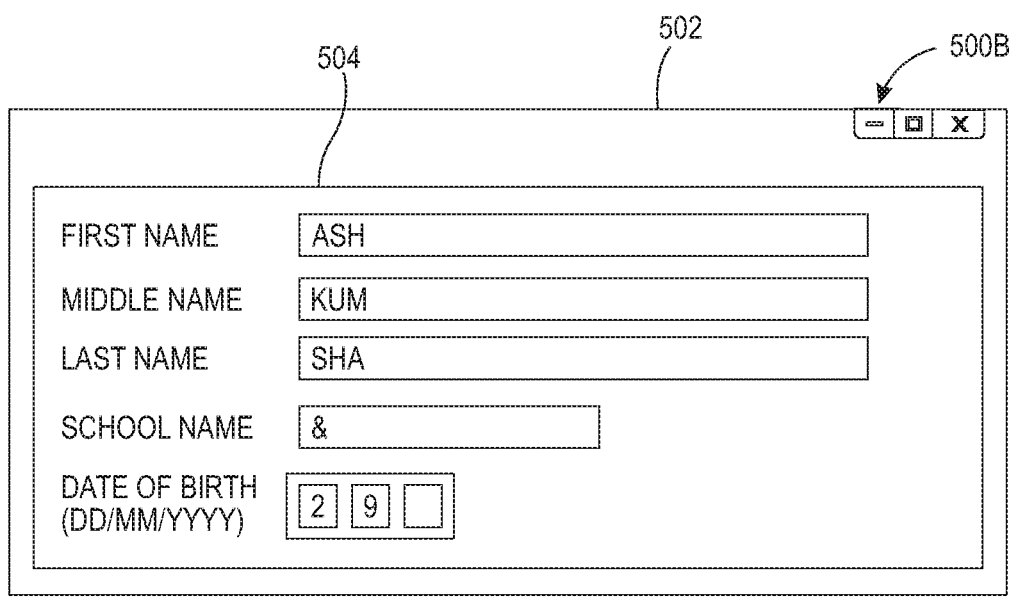
Figure 5C:
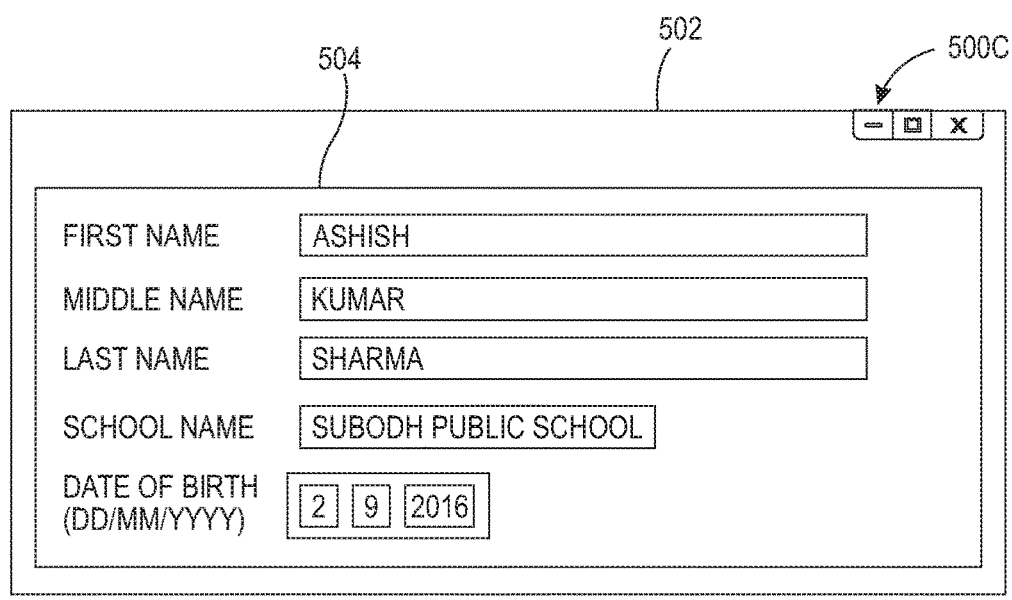

In the exemplary embodiment started above, in case the Map1.Value is same as Map2.Value, the document processor 204 may goto Map2.FieldName, i.e., "FirstName," using the Map1.location, i.e., "(10, 2)," and fills Map1.Value, i.e., "ASHISH." In this way, the document processor 204 replaces the character strings, i.e., "ASH," in the second format in the generated electronic document with the determined values "ASHISH" at respective locations "(10, 2)" and result in the updated electronic document, as shown in an exemplary user interface 500C in FIG. 5C.

At step 320, a template corresponding to a hand-filled document is determined based on a replacement. In an embodiment, the document processor 204 may be configured to determine the template corresponding to the hand-filled document based on the updated electronic document.

In an embodiment, the processor 202 may be configured to perform one or more operations on the updated electronic document. Examples of the one or more operations may include, but are not limited to, printing of the updated electronic document, printing of a selected portion of the updated electronic document, and sharing the updated electronic document (or a portion of the updated electronic document) with one or more computing devices which may or may not include the user-computing device 104.

In an embodiment, the document processor 204 or the processor 202 may be configured to store the template of the updated electronic document and log of one or more operations on the updated electronic document in the database server 106.

The control passes to end step 322.

Figure 4:
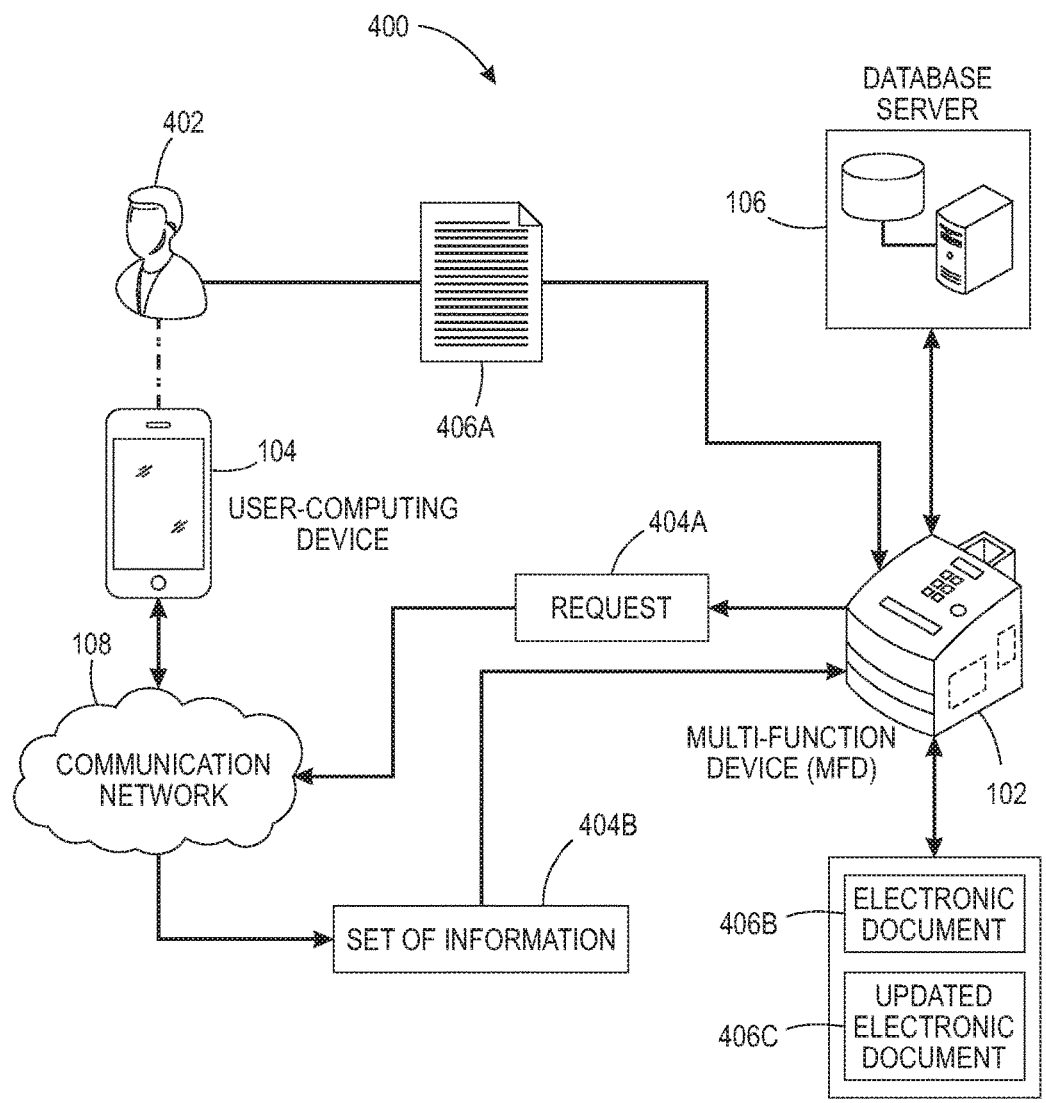
FIG. 4 is a block diagram that illustrates an exemplary scenario for providing assistance for document preparation by a MFD, in accordance with at least one embodiment.

FIG. 4 is a block diagram that illustrates an exemplary scenario for providing assistance for document preparation by a MFD, in accordance with at least one embodiment. FIG. 4 has been described in conjunction with FIGS. 1-3.

With reference to FIG. 4, there is shown an exemplary scenario 400 in which the MFD 102 provides assistance for document preparation, such as an admission form, to a user 402, such as a student. The admission form may be similar to the one as shown in the exemplary interface 500A in FIG. 5A. The user 402 is associated with the user-computing device 104, such as a smart phone. The user 402 provides a hand-filled document 406A, that corresponds to the admission form, to the MFD 102. The hand-filled document 406A is duly filled by the user 402 by utilizing a marker with green ink color. The user 402 fills the application form with the character strings as "ASH," "KUM," "SHA," "&," and "2-9" in the pre-printed respective one or more field names (in black ink color) of the admission form. The one or more field names in the form are "FIRST NAME," "MIDDLE NAME," "LAST NAME," "SCHOOL NAME" AND "DATE OF BIRTH" of the user 402.

The user 402 provides a command to the MFD 102 to perform an optical scanning operation on the hand-filled document 406A. Accordingly, the MFD 102 generates an electronic document 406B based on the optical scanning operation performed on the hand-filled document 406A, similar to the one as shown in the exemplary user interface 500B in FIG. 5B. In an embodiment, the MFD 102 directly receives the electronic document 406B from an application server (not shown). In such a case, the application server generates the electronic document 406B from the hand-filled document 406A in a similar manner, as is generated by the MFD 102.

The generated (or received) electronic document 406B is displayed on the display screen of the MFD 102. Thereafter, the MFD 102 prompts the user 402 to provide the color of the ink via the display screen of the I/O unit 208 of the MFD 102. The user 402 provides an input that indicates that the ink color is "green." Accordingly, the MFD 102 extracts one or more portions from the generated electronic document 406B by utilizing an image processing technique, such as "green" color filtering technique.

Thereafter, the MFD 102 determines locations of the one or more extracted portions from the generated electronic document 406B. Further, the MFD 102 processes the extracted one or more portions to determine the second format of the character strings, such as "ASH," "KUM," "SHA," "&" and "2-9." Thereafter, the user 402 provides an input to the MFD 102 by selecting an auto-fill option via the I/O unit 208, such as the touch screen, of the MFD 102. The user 402 performs a tapping action of the user-computing device 104 against the MFD 102 to establish an NFC connection. Subsequently, the user-computing device 104 provides a set of information 404B to the MFD 102 in response to a request 404A generated by the MFD 102 over the established NFC connection. The set of information 404B includes a plurality of key strings, such as "ASH," "KUM," "SHA," "&," "2-9," respective values, such as "ASHISH," "KUMAR," "SHARMA," "SUBODH PUBLIC SCHOOL," and "2-9-2016," and respective field names, such as "FirstName," "MiddleName," "LastName" "School-Name," "DateOfBirth," in XML format.

Further, the MFD 102 receives the set of information 404B and field values for each of the processed one or more portions in the generated electronic document 406B, based on which field values for one or more field names in the generated electronic document 406B are determined. The determination of the field values are based on successful matches between the character strings in the second format determined in the generated electronic document 406B and key strings from the set of information 404B.

Thereafter, the MFD 102 updates the generated electronic document 406B to generate an updated electronic document 406C. The updated electronic document 406C is generated based on the replacement of the processed portions for the field names with the determined field values. For example, the character string "ASH" in the second format which is determined based on the processing of the corresponding portion for the field name "FIRST NAME" is replaced with the value "ASHISH" from the set of information 404B at the corresponding location. Further, the document processor 204 may be configured to determine the template corresponding to the hand-filled document based on the replacement. In addition, the processor 202 may be configured to perform one or more operations, such as printing or sharing, on the updated electronic document 406C.

FIGS. 5A, 5B, and 5C, collectively, illustrate various interfaces, in accordance with at least one embodiment. There is shown one exemplary interface 500A corresponding to a physical paper form and two exemplary user interfaces 500B and 500C corresponding to a generated electronic document and an updated electronic document, respectively. The exemplary interface 500A and the exemplary user interfaces 500B and 500C have been illustrated, in conjunction with FIGS. 1-4.

With reference to the exemplary interface 500A, there is shown a visualization of an application form 502. There is further shown a section 504 of the application form 502 to be filled by a user. The section 504 includes one or more pre-printed field names, such as "FIRST NAME," "MIDDLE NAME," "LAST NAME," "SCHOOL NAME," and "DATE OF BIRTH," and corresponding document areas 504A to 504E. The document areas 504A to 504E are filled by a user with shortened or abbreviated character strings for actual field values corresponding to the field names. The ink color of the marker or pen of the abbreviated character strings hand-filled by the user should be different from the ink color of the pre-printed field names.

With reference to the exemplary user interface 500B in FIG. 5B, there is shown a generated electronic document of the section 504 of the application form 502. There is shown that the document areas 504A to 504E have been filled by the user with shortened or abbreviated character strings, such as "ASH," "KUM," "SHA," "&," and "2-9," for the pre-printed field names, such as "FIRST NAME," "MIDDLE NAME," "LAST NAME," "SCHOOL NAME," and "DATE OF BIRTH," respectively.

With reference to the exemplary user interface 500C in FIG. 5C, there is shown an updated electronic document of the section 504 of the application form 502. There is shown that the shortened or abbreviated character strings have been replaced by the MFD 102 with corresponding field values, such as "ASHISH," "KUMAR," "SHARMA," "SUBODH PUBLIC SCHOOL," and "2-9-2016," respectively, at corresponding locations (i.e., locations of the document areas 504A to 504E).

The disclosed embodiments encompass numerous advantages. The disclosure provides a robust, efficient, and simple method and system for providing assistance, by an MFD, to a user for document preparation. Thus, the disclosed method and system, as compared to existing techniques, may require lesser storage capacity and execute the documents with higher processing speed due to non-dependency on the field names, template, and language of the physical paper documents.

The disclosed method and system may be utilized to generate a completely filled, legible, readable, and verified document for the user in real-time. The disclosed method and system further increases the efficiency of document management team in any service-based organization as it provides the organization representatives to execute the document work more effectively, quickly, and accurately.

The disclosed method and system mitigates various miscellaneous issues related to spelling errors and scribbled handwriting of the user. The user may just provide shortened or abbreviated form of the actual field values and the corresponding portions are automatically populated based on set of information received from user-computing devices associated with the user. Thus, the user not be required to every time pull out relevant document, such as credit card or social security card, to copy the alpha-numerical sequence while filling the physical paper documents. Further, the users may not be required to fill the same information repeatedly in multiple application form(s) (as much of the information required by the application form(s) corresponding to different services, administrations or organizations is common). The set of information already stored in the user-computing devices is communicated to the MFD and the form is automatically completed accordingly. Thus, a significant manual effort and intervention is saved and the completion time is shortened for filling multiple application forms.

Thus, the disclosed method provides a fast, accurate, and reliable technique for preparing the documents. The disclosed method may be incorporated in existing software codes (or algorithms) or implemented on various existing devices for document preparation, such as application forms (corresponding to banks, hospitals, railways, and the like), invoice documents, legal documents, and/or the like.

The disclosed method and system, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive, such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks, such as LAN, MAN, WAN, and the internet. The computer system facilitates input from a user through input devices accessible to the system through the I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The system and method described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic." Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above method and system, or the numerous possible variations thereof.

Various embodiments of the method and system for providing assistance by an MFD for document preparation have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person having ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for providing assistance, by a multi-function device (MFD), for document preparation, said method comprising:

processing, by one or more processors in said MFD, one or more portions for one or more field names in an electronic document, wherein said electronic document corresponds to a hand-filled document comprising a character string in a first format for a field name of said one or more field names in said hand-filled document, wherein said one or more portions are extracted from said electronic document to determine a second format and a location of said character string in said electronic document, wherein said extraction of said one or more portions from said electronic document is based on a user input that indicates a first ink color of said character string, wherein said first ink color of said character string in said electronic document is different from a second ink color of said one or more field names of said electronic document;

receiving, by said one or more processors in said MFD, a set of information in a pre-specified format for said one or more field names from a user-computing device over a communication network, wherein said set of information comprises at least a plurality of key strings and corresponding values;

determining, by said one or more processors in said MFD, a field value for each processed portion in said electronic document based on a match between said character string in said second format and at least one of said plurality of key strings associated with field names in said received set of information; and updating, by said one or more processors in said MFD, said electronic document based on replacement of said processed portion in said electronic document for each of said one or more field names with a corresponding determined field value at said location.

2. The method of claim 1, wherein said character string in said first format in said hand-filled document corresponds to at least one of a shortened or an abbreviated form of said determined field value.

3. The method of claim 1, wherein each of said plurality of key strings in said received set of information is distinct.

4. The method of claim 1, further comprising generating, by said one or more processors in said MFD, said electronic document from said hand-filled document, wherein said hand-filled document is obtained from a user associated with said user-computing device.

5. The method of claim 1, further comprising receiving, by said one or more processors in said MFD, said electronic document from an application server, wherein said application server is configured to generate said electronic document from said hand-filled document, wherein said hand-filled document is obtained from a user associated with said user-computing device.

6. The method of claim 1, further comprising determining, by said one or more processors in said MFD, said location of said processed one or more portions for said one or more field names in said electronic document.

7. The method of claim 4, wherein said processing of said one or more portions in said generated electronic document to determine said second format of said character string is based on one or more handwriting recognition techniques.

8. The method of claim 1, further comprising applying, by said one or more processors in said MFD, a color filter on said electronic document for said extraction of said one or more portions for said one or more field names from said electronic document, wherein said color filter corresponds to said first ink color of said character string in said electronic document indicated in said user input.

9. The method of claim 1, wherein said set of information further comprises a plurality of field names, wherein each of said plurality of field names is associated with a corresponding key string of said plurality of key strings, wherein each key string of said plurality of key strings has a corresponding value.

10. The method of claim 1, further comprising performing one or more operations, by said one or more processors in said MFD, on said updated electronic document, wherein said one or more operations include one of printing of said updated electronic document or sharing said updated electronic document with one or more other computing devices.

11. The method of claim 1, further comprising determining a template corresponding to said hand-filled document based on replacement of said processed one or more portions in said electronic document for each of said one or more field names with said corresponding determined field value at said location.

12. A system for providing assistance, by a multi-function device (MFD), for document preparation, said system comprising:

one or more processors in said MFD configured to:
process one or more portions for one or more field names in an electronic document, wherein said electronic document corresponds to a hand-filled document comprising a character string in a first format for a field name of said one or more field names in said hand-filled document, wherein said one or more portions are extracted from said electronic document to determine a second format and a location of said character string in said electronic document, wherein said extraction of said one or more portions from said electronic document is based on a user input that indicates a first ink color of said character string, wherein said first ink color of said character string in said electronic document is different from a second ink color of said one or more field names of said electronic document;
receive a set of information in a pre-specified format for said one or more field names from a user-computing device over a communication network, wherein said set of information comprises at least a plurality of key strings and corresponding values;
determine a field value for each processed portion in said electronic document based on a match between said character string in said second format and at least one of said plurality of key strings associated with field names in said received set of information; and
update said electronic document based on replacement of said processed portion in said electronic document for each of said one or more field names with a corresponding determined field value at said location.

13. The system of claim 12, wherein said character string in said first format in said hand-filled document corresponds to at least one of a shortened or an abbreviated form of said determined field value.

14. The system of claim 12, wherein each of said plurality of key strings in said received set of information is distinct.

15. The system of claim 12, further comprising generating, by said one or more processors in said MFD, said electronic document from said hand-filled document, wherein said hand-filled document is obtained from a user associated with said user-computing device.

16. The system of claim 12, further comprising receiving, by said one or more processors in said MFD, said electronic document from an application server, wherein said application server is configured to generate said electronic document from said hand-filled document, wherein said hand-filled document is obtained from a user associated with said user-computing device.

17. The system of claim 12, wherein said one or more processors in said MFD are further configured to determine said location of said processed one or more portions for said one or more field names in said electronic document.

18. The system of claim 15, wherein said processing of said one or more portions in said generated electronic document to determine said second format of said character string is based on one or more handwriting recognition techniques.

19. The system of claim 12, wherein said one or more processors in said MFD are further configured to apply a color filter on said electronic document for said extraction of said character string for each of said one or more field names from said electronic document, wherein said color filter corresponds to said first ink color of said character string in said electronic document indicated in said user input.

20. The system of claim 12, wherein said set of information further comprises a plurality of field names, wherein each of said plurality of field names is associated with a corresponding key string of said plurality of key strings, wherein each key string of said plurality of key strings has a corresponding value.

21. The system of claim 12, wherein said one or more processors in said MFD are further configured to perform one or more operations on said updated electronic document, wherein said one or more operations include one of printing of said updated electronic document or sharing said updated electronic document with one or more other computing devices.

22. The system of claim 12, wherein said one or more processors are further configured to determine a template corresponding to said hand-filled document based on replacement of said processed one or more portions in said electronic document for each of said one or more field names with said corresponding determined field value at said location.

23. A computer program product for use with a computer, said computer program product comprising a non-transitory computer readable medium, wherein said non-transitory computer readable medium stores a computer program code for providing assistance for document preparation by a multi-function device (MFD), said computer program code is executable by one or more processors in said MFD to:
process one or more portions for one or more field names in an electronic document, wherein said electronic document corresponds to a hand-filled document comprising a character string in a first format for a field name of said one or more field names in said hand-filled document, wherein said one or more portions are extracted from said electronic document to determine a second format and a location of said character string in said electronic document, wherein said extraction of said one or more portions from said electronic document is based on a user input that includes indication of a first ink color of said character string, wherein said first ink color of said character string in said electronic document is different from a second ink color of said one or more field names of said electronic document;
receive a set of information in a pre-specified format for said one or more field names from a user-computing device over a communication network, wherein said set of information comprises at least a plurality of key strings and corresponding values;
determine a field value for each processed portion in said electronic document based on a match between said character string in said second format and at least one of said plurality of key strings associated with field names in said received set of information; and
update said electronic document based on replacement of said processed portion in said electronic document for each of said one or more field names with a corresponding determined field value at said location.

* * * * *